3,353,366
ABSORPTION REFRIGERATION SYSTEMS

Sabatino R. Orfeo, Morris Plains, and Kevin P. Murphy, Bernardsville, N.J., assignors to Allied Chemical Corporation, New York, N.Y., a corporation of New York
No Drawing. Filed Jan. 27, 1966, Ser. No. 523,277
5 Claims. (Cl. 62—112)

This invention relates to the provision of a novel class of working fluids for absorption refrigeration systems.

In absorption refrigeration systems, like conventional compression refrigeration systems, a refrigerant liquid is vaporized in an evaporator, takes in heat at low temperature, is compressed to a pressure such that it condenses at a higher temperature in the condenser and then is returned to the evaporator for recycling. The difference in the two systems lies in the means for effecting compression of the refrigerant vapor. In a conventional compression refrigeration system, this is accomplished by a mechanical compressor. In an absorption refrigeration system, this is accomplished by contacting the refrigerant vapor with a medium which absorbs or otherwise ties up the refrigerant vapor so that the refrigerant can be returned to the high (pressure) side without the need for expending a large amount of mechanical work to compress the vapor. At the high side, the absorbed refrigerant is released by decomposing with heat, following which the absorbing medium is returned to the absorber for reuse and the refrigerant is condensed and returned to the evaporator to complete the cycle. The combination of refrigerant and absorbing medium is commonly referred to as working fluid.

A large body of know-how, regarding apparatus and techniques for utilizing working fluids for absorption refrigeration, exists and is recorded in the literature and accordingly it will not be necessary to go into such a discussion herein. It will be apparent to anyone skilled in the art that the novel working fluids to be described herein may be adapted for use in a wide variety of absorption-type refrigeration applications and the means for carrying out such adaptations will likewise be apparent.

It is accordingly an object of this invention to provide a novel class of working fluids for absorption refrigeration systems.

It is another object of the invention to provide a novel class of working fluids for absorption refrigeration systems which are capable of regenerating refrigerant directly in liquid state, thus obviating the need for a condensation step.

Another object of the invention is to provide a novel and preferred class of absorption refrigeration working fluids which are non-toxic.

Other objects and advantages of the invention will be apparent from the following description.

We have found that certain inclusion or clathrate compounds of certain gases and water, which have a critical decomposition temperature (C.D.T.) of at least about 15° C. are particularly suited for use as working fluids for absorption refrigeration systems. As is known, inclusion compounds are those in which two or more compounds are associated without ordinary chemical union through partial or complete enclosure of the molecules of one compound by the molecular lattice structure of another compound. In so-called clathrate compounds, the entrapped molecules are completely surrounded by the lattice structure. Many gases form such inclusion type compounds with water, which inclusion compounds are commonly referred to as gas hydrates.

Specific examples of gases which form gas hydrates within the scope of the invention include the following:

| Gas | C.D.T. of gas hydrate, ° C. |
|---|---|
| $CH_2ClF$ | 17.8 |
| $CH_2F_2$ | 20.4 |
| $CH_3F$ | 18.8 |
| $CHF_2Cl$ | 16.3 |
| $C_2H_5F$ | 22.8 |
| $CH_3Cl$ | 21.0 |
| $C_2H_4F_2$ | 15.33 |
| $C_2H_2$ | 16.0 |
| $H_2S$ | 29.5 |
| $Cl_2$ | 28.7 |

It is to be understood that this listing is for illustrative purposes only. Other gas hydrates having the above indicated requirements are known and will be recognized by this description by those of ordinary skill in this art. Still others will be discovered and all come within the scope of the invention.

Because of their low toxicity and high refrigerating capacity, as a class, gas hydrates of fluorocarbons, and particularly aliphatic fluorinated hydrocarbons, with water constitute the preferred working fluids of the invention.

The formation and decomposition of the gas hydrates are completely reversible under the appropriate conditions. The reactions are illustrated, with a specific example, by the following equation:

$$CH_2ClF + H_2O \rightleftharpoons CH_2ClF \cdot 7.7H_2O$$

The gas which forms the hydrate with water serves as the refrigerant in an absorption refrigeration cycle and water serves as the absorbent.

In an actual absorption cycle, the vapor formed by the refrigerant gas in an evaporator may be contacted with water in an absorber section, at a temperature below the C.D.T. of the corresponding solid gas hydrate. The pressure will build up in this absorber section until the gas hydrate equilibrium pressure is reached, at which time gas hydrate crystals are formed, thus removing the refrigerant vapor. This process will maintain the pressure at a constant level as long as there is water available. The solid gas hydrate, in excess water, which is in the form of a slurry, may then be pumped to a decomposition chamber wherein it is heated to decompose the same, thereby regenerating water and refrigerant. There are two different ways of completing the cycle.

In a first mode, the gas hydrate slurry is heated to a temperature below the C.D.T. of the gas hydrate. As the temperature of the system rises, the equilibrium pressure rises. When the equilibrium pressure reaches the saturation pressure of the refrigerant gas at the condensing temperature; the gas hydrate will decompose, releasing the entrapped refrigerant gas in order to maintain the pressure in the system. This process will continue as long as any gas hydrate is present in the decomposition chamber. The released refrigerant gas is condensed to liquid form and then is drawn off to a receiver. The water freed by the decomposition of the gas hydrate is returned to the absorber. The refrigerant liquid in the receiver is released through an expansion valve to the evaporator, thus completing the cycle.

In the second mode, the gas hydrate slurry is heated to a temperature above the C.D.T. of the gas hydrate. Preferably this temperature should not be more than about 5–10° C. higher than the C.D.T. In any event this temperature should not exceed the critical temperature of the refrigerant. Under such conditions, the gas hydrate decomposes and separates directly into two liquid layers, one water and the other refrigerant. It can thus be seen that by this mode, the need for a condensing step is obviated and this mode is accordingly preferred. The water layer, which is essentially immiscible with and of different density than the refrigerant layer, can then be readily drawn off and returned to the absorber and, as before, the liquid refrigerant is piped to a receiver and thence to the evaporator via an expansion valve.

The following illustrate practice of the invention.

Example 1

In an illustrative cycle, according to the first mode described supra, $CH_2F_2$ (critical temperature, 172.4° F.) is employed as refrigerant. In an evaporator, at 8.0 atmospheres and 32° F., $CH_2F_2$ refrigerant liquid is boiled, absorbing heat from the area to be cooled. The vapors generated by the boiling are then led to an absorber where they are contacted with water. The absorber conditions are 8.0 atmospheres and 60° F. The absorber temperature is maintained by circulation of water to dissipate the heat of formation of the hydrate. Under these conditions, the $CH_2F_2$ hydrate (C.D.T. 68.7° F.) forms in the absorber. The resulting gas hydrate slurry is pumped to a decomposition chamber where it is heated to 66° F. at a pressure of 12.5 atmospheres. The gas hydrate decomposes to form water and gaseous refrigerant. The water is returned to the absorber and the gaseous refrigerant is liquefied by a condenser at 60° F. and returned to the evaporator via a receiver, thus completing the cycle.

Example 2

In an illustrative cycle, according to the second mode described supra, as before, $CH_2F_2$ (critical temperature, 172.4° F.) is employed as refrigerant. In an evaporator, at 8.0 atmospheres and 32° F., $CH_2F_2$ refrigerant liquid is boiled, absorbing heat from the area to be cooled. The vapors generated by the boiling are then led to an absorber where they are contacted with water. The absorber conditions are 8.0 atmospheres and 60° F. The absorber temperature is maintained by circulation of water to dissipate the heat of formation of the hydrate. Under these conditions, the $CH_2F_2$ hydrate (C.D.T. 68.7° F.) forms in the absorber. The resulting gas hydrate water slurry is pumped to a decomposition chamber where it is heated to 77° F. at a pressure of 16.4 atmospheres. Under these conditions the hydrate decomposes to form two liquid layers of water and $CH_2F_2$. Water is separated and returned to the absorber. $CH_2F_2$ is separated and returned to the evaporator via a receiver, thus completing the cycle.

It will be apparent to one skilled in this art that a wide variety of applications of the novel working fluids may be made and that modifications and variations may be made without departing from the scope and the spirit of the invention. For example, there may be incorporated in the working fluids various additives, such as solubilizing agents, such as ethylene glycol, to accelerate the formation of the gas hydrates, lubricants, stabilizers, etc.

The invention is thus not to be limited by any specific illustration described herein but only by the scope of the appended claims.

We claim:
1. The method of absorption refrigeration which comprises:
    (a) evaporating, in the vicinity of a body to be cooled, a refrigerant comprising a normally gaseous material which, with water, forms a gas hydrate having a critical decomposition temperature of at least about 15° C.,
    (b) bringing the evaporated refrigerant vapors in contact with water under conditions operative to form the gas hydrate,
    (c) heating the gas hydrate to decompose the same into water and refrigerant and
    (d) returning the refrigerant in liquid form to the vicinity of the body to be cooled for reevaporation and recycling.
2. The process according to claim 1 in which the normally gaseous material is a fluorocarbon.
3. The process according to claim 1 in which the normally gaseous material is chlorofluoromethane.
4. The process according to claim 1 in which the normally gaseous material is difluoromethane.
5. The process according to claim 1 in which the gas hydrate is heated above its critical decomposition temperature to decompose the same directly into liquid refrigerant and water.

References Cited

UNITED STATES PATENTS

| | | | |
|---|---|---|---|
| 1,968,507 | 7/1934 | Midgley, et al. | 62—112 |
| 2,255,584 | 9/1941 | Hubacher | 62—112 |
| 2,479,259 | 8/1949 | Reed et al. | 62—112 |
| 2,638,760 | 5/1953 | Mills | 62—112 |
| 3,203,194 | 8/1965 | Fuderer | 62—112 |
| 3,243,966 | 4/1966 | Glew | 62—467 |

LLOYD L. KING, *Primary Examiner.*